(12) United States Patent
Hsu et al.

(10) Patent No.: US 9,274,397 B2
(45) Date of Patent: Mar. 1, 2016

(54) REFLECTIVE DISPLAY DEVICE HAVING THE FUNCTIONS OF BOTH MONOCHROME AND COLOR DISPLAY MODES AND DRIVING METHOD THEREOF

(71) Applicant: E Ink Holdings Inc., Hsinchu (TW)

(72) Inventors: Cheng-Hang Hsu, Hsinchu (TW); Tzung-Wei Yu, Hsinchu (TW); Kuan-Yi Lin, Hsinchu (TW); Ted-Hong Shinn, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 25 days.

(21) Appl. No.: 14/183,532

(22) Filed: Feb. 19, 2014

(65) Prior Publication Data
US 2014/0361970 A1 Dec. 11, 2014

(30) Foreign Application Priority Data
Jun. 7, 2013 (TW) .............................. 102120360 A

(51) Int. Cl.
| | | |
|---|---|---|
| *G09G 3/34* | (2006.01) | |
| *G02F 1/167* | (2006.01) | |
| *G02F 1/1335* | (2006.01) | |

(52) U.S. Cl.
CPC .............. *G02F 1/167* (2013.01); *G09G 3/3413* (2013.01); *G02F 2001/133616* (2013.01); *G02F 2001/133622* (2013.01); *G09G 3/344* (2013.01)

(58) Field of Classification Search
CPC ................................ G09G 3/344; G02F 1/167
USPC ......................................................... 345/107
See application file for complete search history.

(56) References Cited

U.S. PATENT DOCUMENTS

| | | | |
|---|---|---|---|
| 5,977,942 A | 11/1999 | Walker et al. | |
| 6,453,067 B1 | 9/2002 | Morgan et al. | |
| 7,616,185 B2 * | 11/2009 | Yamaguchi et al. | 345/107 |
| 8,207,928 B2 | 6/2012 | Johnson et al. | |
| 8,545,035 B1 * | 10/2013 | Beguin et al. | 362/97.1 |
| 2002/0070914 A1 | 6/2002 | Bruning et al. | |
| 2002/0101433 A1 * | 8/2002 | McKnight | 345/589 |
| 2004/0246225 A1 * | 12/2004 | Mukawa et al. | 345/102 |
| 2005/0046765 A1 * | 3/2005 | Liu | 349/61 |
| 2005/0105159 A1 | 5/2005 | Paolini, Jr. et al. | |
| 2007/0132675 A1 | 6/2007 | Asao | |
| 2011/0255303 A1 | 10/2011 | Nichol et al. | |
| 2011/0261094 A1 | 10/2011 | Ruckmongathan | |
| 2012/0200810 A1 | 8/2012 | Horikawa | |

* cited by examiner

*Primary Examiner* — Roy Rabindranath
(74) *Attorney, Agent, or Firm* — Jianq Chyun IP Office

(57) ABSTRACT

A reflective display device includes a drive array substrate, an electrophoretic display film, a reflective optical film and a light source module. The electrophoretic display film is disposed on the drive array substrate and includes a plurality of display mediums. The reflective optical film is disposed on the electrophoretic display film. The light source module is disposed beside the reflective optical film. A light emitting from the light source module is reflected to the electrophoretic display film by the reflective optical film. The light source module includes a plurality of first-color light sources, a plurality of second-color light sources and a plurality of third-color light sources which are switched on in sequence. The reflective display device is in a color display mode when the light source module is turned on. The reflective display device is in a monochrome display mode when the light source module is turned off.

9 Claims, 3 Drawing Sheets

REFLECTIVE DISPLAY DEVICE HAVING THE FUNCTIONS OF BOTH MONOCHROME AND COLOR DISPLAY MODES AND DRIVING METHOD THEREOF

CROSS-REFERENCE TO RELATED APPLICATION

This application claims the priority benefit of Taiwan application serial no. 102120360, filed on Jun. 7, 2013. The entirety of the above-mentioned patent application is hereby incorporated by reference herein and made a part of this specification.

BACKGROUND OF THE INVENTION

1. Field of the Invention

The invention relates to a display device and a driving method thereof, and more particularly to a reflective display device and a driving method thereof.

2. Description of Related Art

With the advancement in electrical-optical and semiconductor technologies, development of flat panel displays has been prosperous. Among various flat panel displays, liquid crystal displays (LCDs) have soon become the main stream in the market due to advantageous features of better space utilization, low power consumption, non-radiation, and low electromagnetic interference (EMI). It is commonly known that an LCD includes an LCD panel and a backlight module, and since the LCD panel is a design of non-self-illumination, it is necessary to dispose the backlight module below the LCD panel to provide a plane light source required by the LCD panel. Thereby, the LCD is able to display images and pictures for viewers.

The design principle for providing a plane light source required by the LCD panel from the backlight module of a traditional LCD generally includes providing white light, and then displaying desired colors of each pixel through color filters at each pixel in the LCD panel. In light of the above, it is necessary to dispose red, green, and blue color filters at each pixel, which results in a higher manufacturing cost. In addition, transmittance, brightness and saturation displayed by each pixel after light passes through the color filters are lower. Furthermore, since light from the backlight module has to pass through the color filters, light source utilization of the backlight module is reduced.

SUMMARY OF THE INVENTION

The invention is directed to a reflective display device which does not need to dispose color filters and is able to have the functions of both monochrome and color display modes by turning on/off the light source module and switching between the light sources with different colors.

The invention is further directed to a driving method for reflective display device for driving the aforesaid reflective display device.

The reflective display device includes a drive array substrate, an electrophoretic display film, a reflective optical film and a light source module. The electrophoretic display film is disposed on the drive array substrate and includes a plurality of display mediums, wherein each of the display mediums includes an electrophoresis buffer and a plurality of black charged particles and a plurality of white charged particles distributed in the electrophoresis buffer. The reflective optical film is disposed on the electrophoretic display film. The light source module is disposed beside the reflective optical film, and the reflective optical film reflects light generated by the light source module to the electrophoretic display film. The light source module includes a plurality of first-color light sources, a plurality of second-color light sources and a plurality of third-color light sources, which are switched on in sequence. The reflective display device is in a color display mode when the light source module is turned on, and the reflective display device is in a monochrome display mode when the light source module is turned off.

According to an embodiment of the invention, each of the display medium further includes a microcup structure, and the electrophoresis buffer, the black charged particles and the white charged particles are stuffed in the microcup structure.

According to an embodiment of the invention, the first-color light sources, the second-color light sources and the third-color light sources are respectively a plurality of red light-emitting diode (LED) light sources, a plurality of blue LED light sources and a plurality of green LED light sources, or the first-color light sources, the second-color light sources and the third-color light sources are respectively a plurality of cyan LED light sources, a plurality of magenta LED light sources and a plurality of yellow LED light sources.

According to an embodiment of the invention, the first-color light sources, the second-color light sources and the third-color light sources are arranged alternately on one side of the reflective optical film.

According to an embodiment of the invention, the first-color light sources, the second-color light sources and the third-color light sources are disposed surrounding the circumference of the reflective optical film.

According to an embodiment of the invention, the light source module further includes a plurality of fourth-color light sources, wherein the first-color light sources, the second-color light sources, the third-color light sources and the fourth-color light sources are switched on in sequence, and the fourth-color light sources are a plurality of white LED light sources.

According to an embodiment of the invention, the reflective optical film includes: an optical film layer and a plurality of optical microstructures. The optical microstructures are disposed on the optical film layer, wherein the density of the optical microstructure gradually increases from a side adjacent to the light source module to a side away from the light source module.

The driving method of the reflective display device is used for driving the reflective display device and includes the following steps. When the light source module is turned on, the electrophoretic display film is driven and the first-color light sources, the second-color light sources and the third-color light sources are switched on by a switching frequency, wherein motion frequencies of the black charged particles and the white charged particles in the electrophoretic display film are synchronized with the switching frequency. When the light source module is turned off, the electrophoretic display film is driven to transform the reflective display device from the color display mode into the monochrome display mode.

According to an embodiment of the invention, the renewal frequencies of the color display mode are larger than 10 Hertz.

According to an embodiment of the invention, the switching frequency is larger than 30 Hertz.

Based on the above, the reflective display device of the invention does not need to dispose the color filters. Merely by turning on/off the light source module and switching between the light sources with different colors in the light source module and reflecting light generated by the light source module into the electrophoretic display film through the reflective optical film, the reflective display device is able to have the functions of presenting in both color and monochrome display modes. Herein, in the light path, merely the white charged particles of the electrophoretic display film reflect light. Therefore, no color filters are disposed to absorb or scatter light, and thereby optical loss is considerably reduced, which further enhances brightness, saturation and transmittance of the reflective display device of the invention.

To make the above features and advantages of the invention more comprehensible, several embodiments accompanied by drawings are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the invention.

DESCRIPTION OF EMBODIMENTS

Figure 1A:
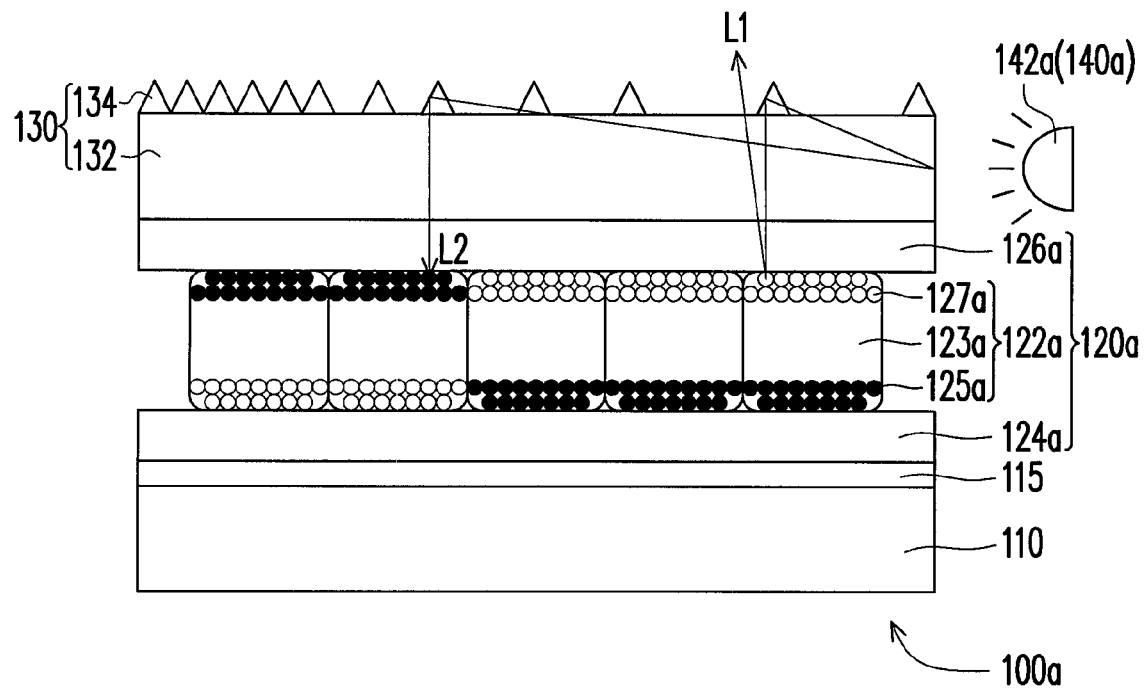
FIG. 1A illustrates a schematic view of a reflective display device according to an embodiment of the invention.
Figure 1B:
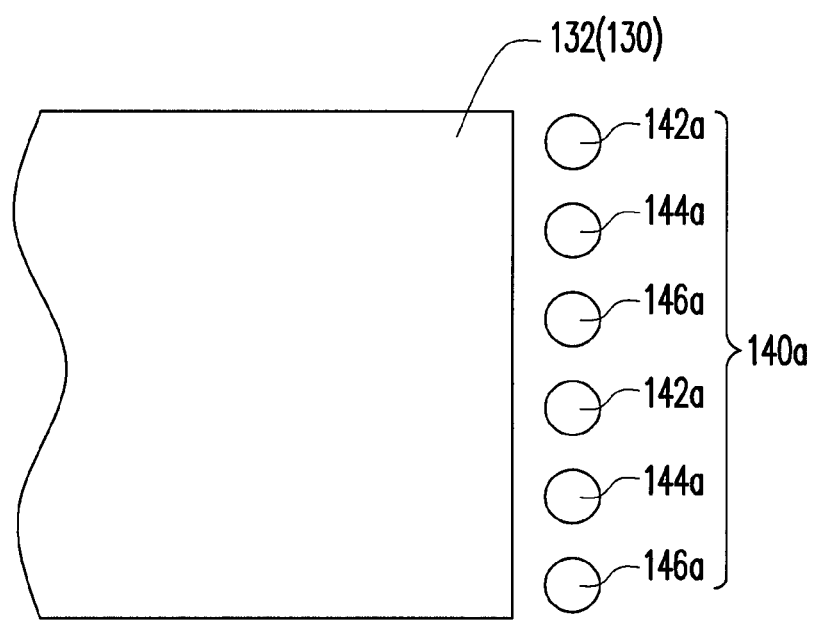
FIG. 1B illustrates a schematic partial top view of the reflective display device and the light source module of an embodiment depicted in FIG. 1A.

FIG. 1A illustrates a schematic view of a reflective display device according to an embodiment of the invention. FIG. 1B illustrates a schematic partial top view of the reflective display device and the light source module of an embodiment depicted in FIG. 1A. For the convenience of description, certain elements are omitted in FIG. 1B. Referring to both FIGS. 1A and 1B, in the present embodiment, the reflective display device 100a includes a drive array substrate 110, an electrophoretic display film 120a, a reflective optical film 130 and a light source module 140a.

In detail, the electrophoretic display film 120a is disposed on the drive array substrate 110 and includes a plurality of display mediums 122a, wherein each of the display medium 122a includes an electrophoresis buffer 123a and a plurality of black charged particles 125a and a plurality of white charged particles 127a distributed in the electrophoresis buffer 123a. The reflective optical film 130 is disposed on the electrophoretic display film 120a. The light source module 140a is disposed beside the reflective optical film 130, and the reflective optical film 130 reflects light generated by the light source module 140a to the electrophoretic display film 120a. The light source module 140a includes a plurality of first-color light sources 142a, a plurality of second-color light sources 144a and a plurality of third-color light sources 146a, which are switched on in sequence.

More particularly, the drive array substrate 110 of the present embodiment is used for driving the electrophoretic display film 120a, wherein the drive array substrate 110 is, for example, an active array substrate or a passive array substrate. The electrophoretic display film 120a is secured on the drive array substrate 110 through a transparent optical cement 115. As shown in FIG. 1A, the electrophoretic display film 120a further includes a first protective layer 124a and a second protective layer 126a, wherein the second protective layer 126a and the first protective layer 124a are disposed opposite to each other, and the display mediums 122a are disposed between the first protective layer 124a and the second protective layer 126a. Herein, the display mediums 122a are, for example, microcapsule structures. In addition, a material of the first protective layer 124a and the second protective layer 126a is, for example, a Poly-ethylene tetrephthalate (PET).

Furthermore, the reflective optical film 130 of the present embodiment is composed of an optical film layer 132 and a plurality of optical microstructures 134, wherein the optical film layer 132 is, for example, a diffusion film. The optical microstructures 134 are disposed on the optical film layer 132, and more particularly, the density of the optical microstructures 134 gradually increases from a side adjacent to the light source module 140a to a side away from the light source module 140a. Thereby, a brightness difference between the dark zone and the light zone is reduced, so that light generated by the light source module 140a is uniformly led out, and brightness of the reflective display device 100a in the effective region is further enhanced, thereby improving a positive luminance.

In addition, as shown in FIGS. 1A and 1B, the first-color light sources 142a, the second-color light sources 144a and the third-color light sources 146a are arranged alternately on one side of the optical film layer 132 of the reflective optical film 130, wherein the on and off of the first-color light sources 142a, the second-color light sources 144a and the third-color light sources 146a may be controlled independently. Herein, the first-color light sources 142a, the second-color light sources 144a and the third-color light sources 146a are respectively a plurality of red LED light sources, a plurality of blue LED light sources and a plurality of green LED light sources, or the first-color light sources 142a, the second-color light sources 144a and the third-color light sources 146a are respectively a plurality of cyan LED light sources, a plurality of magenta LED light sources and a plurality of yellow LED light sources, which are not limited thereto.

Figure 1C:
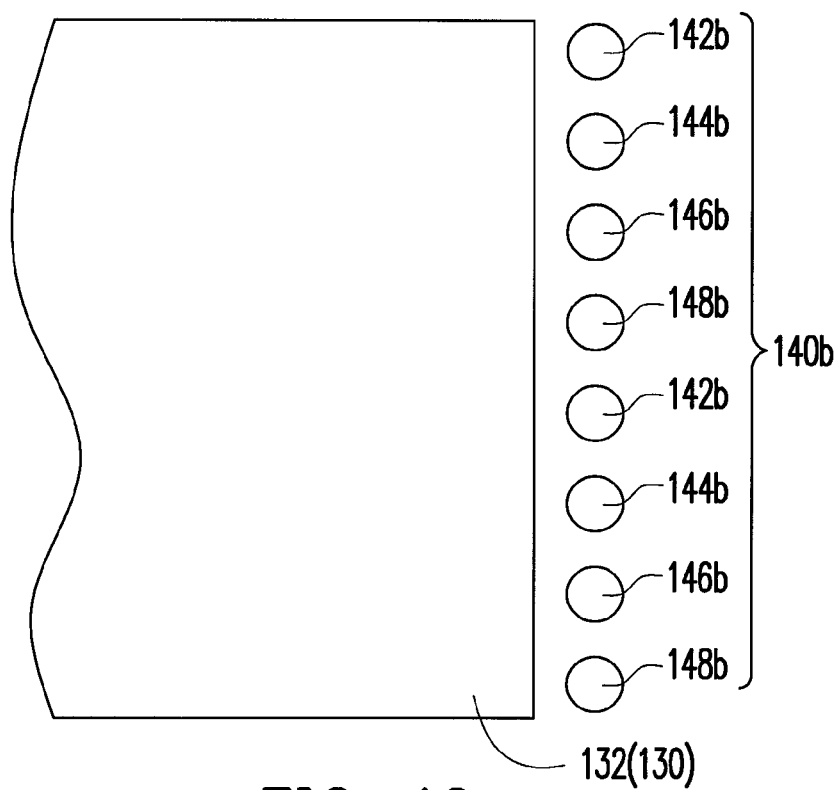
FIG. 1C illustrates a schematic partial top view of the reflective display device and the light source module of another embodiment depicted in FIG. 1A.
Figure 1D:
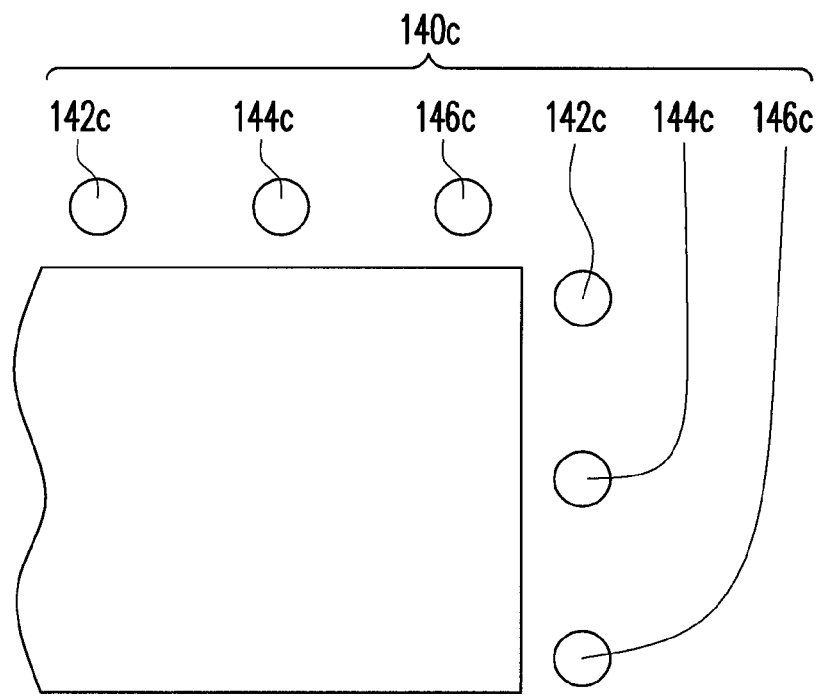
FIG. 1D illustrates a schematic partial top view of the reflective display device and the light source module of further another embodiment depicted in FIG. 1A.

It is worth mentioning that in other embodiments, referring to FIG. 1C, the light source module 140b may further include a plurality of fourth-color light sources 148b, wherein the first-color light sources 142b, the second-color light sources 144b, the third-color light sources 146b and the fourth-color light sources 148b are switched on in sequence, and the fourth-color light sources 148b are, for example, a plurality of white LED light sources. In addition, neither does the present embodiment limit on the arrangement of the first-color light sources 142a, the second-color light sources 144a and the third-color light sources 146a of the light source module 140a. The first-color light sources 142a, the second-color light sources 144a and the third-color light sources 146a herein are specified as being arranged alternately on one side of the optical film layer 132 of the reflective optical film 130. In other embodiments, referring to FIG. 1D, the first-color light sources 142c, the second-color light sources 144c and the third-color light sources 146c of the light source module 140c may also be disposed surrounding the circumference of the optical film layer 132 of the reflective optical film 130. In brief, the embodiment does not limit on the type and number of the light source colors of the light source modules 140a, 140b and 140c. Persons skilled in the art may adjust the disposition of the light sources and omit or add the type and number of the light source colors according to the actual conditions to meet actual requirements, which will not be repeated one by one herein.

Referring further to FIG. 1A, when the light source module 140a of the present embodiment is turned on, the drive array substrate 110 provides a driving voltage to drive the electrophoretic display film 120a and switches between the first-color light sources 142a, the second-color light sources 144a and the third-color light sources 146a with a switching frequency. More preferably, the switching frequency is larger than 30 Hertz, and renewal frequencies of the color display mode are larger than 10 Hertz. At this point, motion frequencies of the black charged particles 125a and the white charged particles 127a in the electrophoretic display film 120a are synchronized with the switching frequency. When light L1 generated by the light source module 140a is emitted into the optical film layer 132 of the reflective optical film 130, the light L1 is transmitted to the electrophoretic display film 120a through reflection by the optical microstructures 134. As shown in FIG. 1A, if the white charged particles 127a are located above the black charged particles 125a, the light L1 is reflected to the outside by the white charged particles 127a, and a color of the light L1 emitted by the first-color light sources 142a is presented. If the black charged particles 125a are located above the white charged particles 127a, light L2 is absorbed by the black charged particles 125a without reflection, and a black color is presented. Thereby, when the light source module 140a is turned on, the reflective display device 100a of the present embodiment may be in a color display mode.

For instance, in the example that dynamic images are displayed by 10 frames per second, the device switches images of three colors of red (R), green (G) and blue (B) rapidly on a timeline. Thereby, renewal frequencies of the images of the three colors of red (R), green (G) and blue (B) need to be at least 30 images per second, i.e. a renewal cycle of grey-scale pictures is 30 ms (1/second). Such a practice is a so-called Field Color Sequential Method. Herein, since human eyes have vision persistence when receiving images from the outside, a reflective display device 100a driven by the Field Color Sequential Method switches between images of each color using the switching frequency to display full-color pictures in coordination with the vision persistence of human eyes. Therefore, the present embodiment does not need to dispose the color filters and is able to display a color picture in the reflective display device 100a.

Figure 1E:
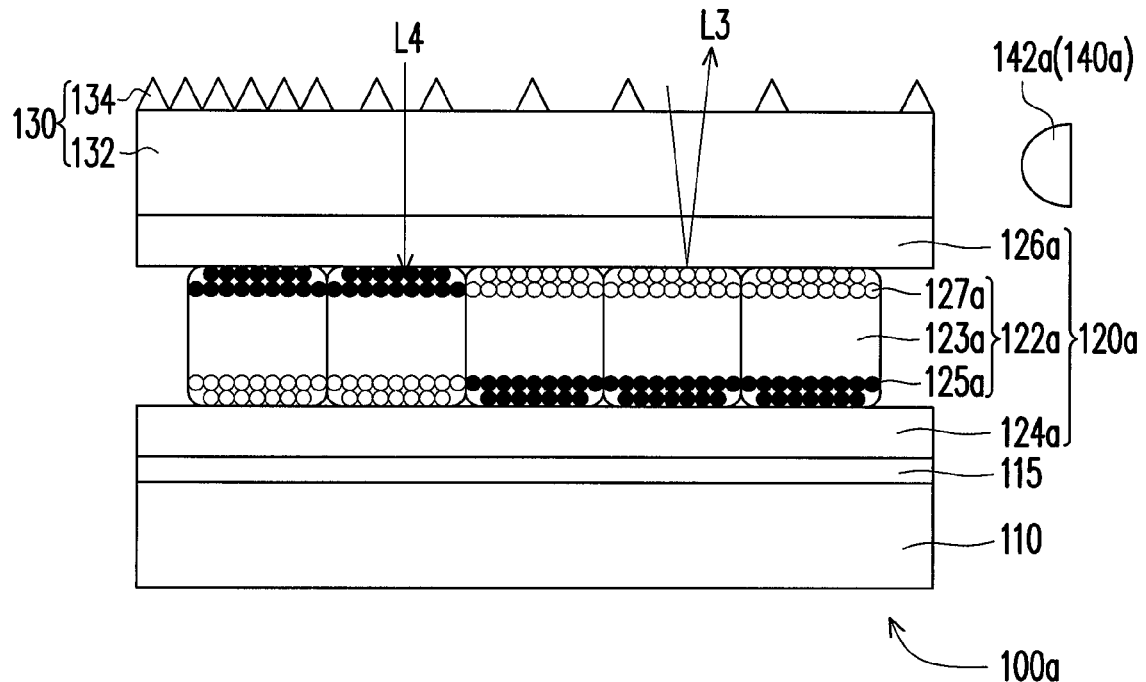
FIG. 1E illustrates a schematic view of the reflective display device of FIG. 1A when the light source module is turned off.

Referring to FIG. 1E, when the light source module 140a is turned off, the drive array substrate 110 still provides a driving voltage to drive the electrophoretic display film 120a. At this point, because the light source module 140a is turned off and cannot provide colored light, the motion of the black charged particles 125a and the white charged particles 127a in the electrophoretic display film 120a presents the reflective display device 100a in a monochrome display mode. That is to say that in the turning on and off of the light source module 140a, light L3 from the external environment entering from the reflective optical film 130 is reflected when coming across the white charged particles 127a, and light L4 from the external environment entering from the reflective optical film 130 is absorbed when coming across the black charged particles 125a. In brief, the mechanism transforms the reflective display device 100a from the color display mode into the monochrome display mode.

In brief, the reflective display device 100a of the present embodiment does not need to dispose the color filters. Merely by turning on/off the light source module 140a, 140b and 140c, and switching between the light sources with different colors in the light source module 140a, 140b or 140c (including the first-color light sources 142a, 142b or 142c, the second-color light sources 144a, 144b or 144c, the third-color light sources 146a, 146b or 146c and the fourth-color light sources 148b) and reflecting light generated by the light source module 140a, 140b or 140c into the electrophoretic display film 120a through the reflective optical film 130, the reflective display device 100a is able to have the functions of presenting in both color and monochrome display modes. Therein, in the light path, merely the white charged particles 127a of the electrophoretic display film 120a reflect the light L1. Therefore, no color filters are disposed to absorb or scatter light, and thereby optical loss is considerably reduced, which further enhances brightness, saturation and transmittance of the reflective display device 100a of the present embodiment.

Figure 2:
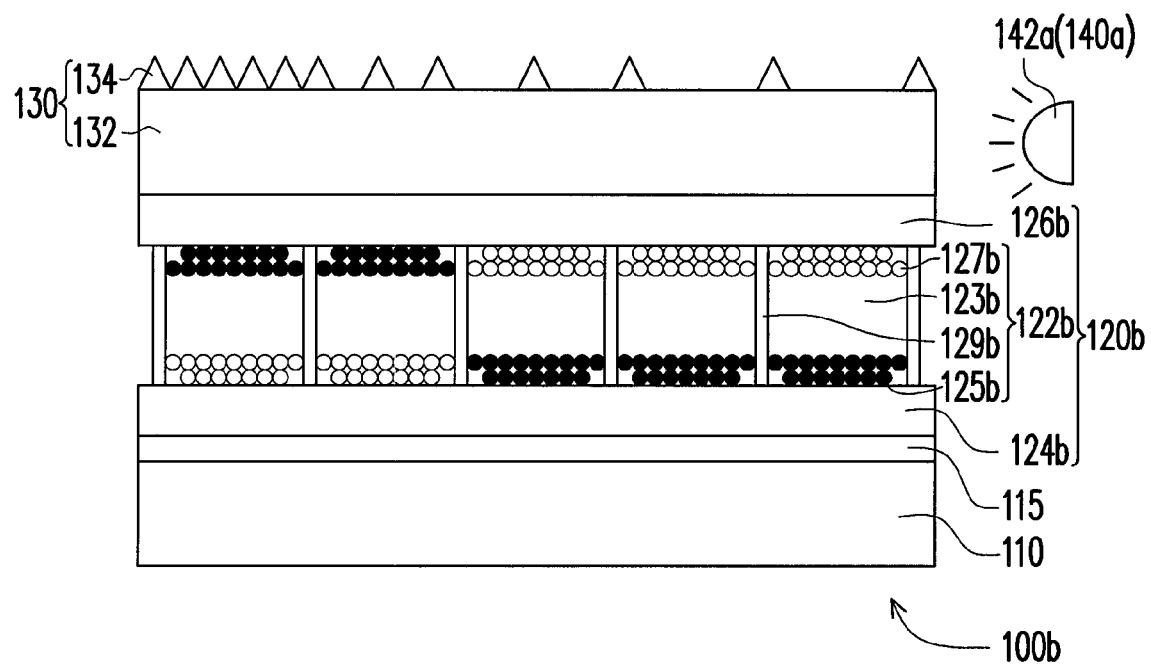
FIG. 2 illustrates a schematic view of a reflective display device according to another embodiment of the invention.

It is worth mentioning that the invention does not limit on the structural form of the electrophoretic display film 120a. Although the display mediums 122a of the electrophoretic display film 120a are specified as the microcapsule structures, in other embodiments, referring to FIG. 2, each of the display mediums 122b of an electrophoretic display film 120b in a reflective display device 100b may further include a microcup structure 129b, wherein the microcup structure 129b is disposed on a first protective layer 124b and joined with a second protective layer 126b, so that an electrophoretic buffer 123b, black charged particles 125b and white charged particles 127b are enclosed within the microcup structure 129b. Herein, the display mediums 122b are, for example, microcup structures, which still belong to an adoptable technical solution of the invention and do not depart from the scope intended by the invention.

In light of the above, the reflective display device of the invention does not need to dispose the color filters. Merely by turning on/off the light source module, switching between the light sources with different colors in the light source module and reflecting light generated by the light source module into the electrophoretic display film through the reflective optical film, the reflective display device is able to have the functions of presenting in monochrome or color display modes. Therein, in the light path, merely the white charged particles of the electrophoretic display film reflect light. Therefore, no color filters are disposed to absorb or scatter light, and thereby optical loss is considerably reduced, which further enhances the brightness, saturation and transmittance of the reflective display device of the invention.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A reflective display device, comprising:
    a drive array substrate;
    an electrophoretic display film, disposed on the drive array substrate and comprises a plurality of display mediums, wherein each of the display mediums comprises an electrophoresis buffer and a plurality of black charged particles and a plurality of white charged particles distributed in the electrophoresis buffer;
    a reflective optical film, disposed on the electrophoretic display film, wherein the reflective optical film comprises an optical film layer and a plurality of optical microstructures disposed on the optical film layer; and
    a light source module, disposed beside the reflective optical film, the reflective optical film reflecting light generated by the light source module to the electrophoretic display film, wherein the density of the optical microstructures gradually increases from a side adjacent to the light source module to a side away from the light source module, and the light source module comprises a plurality of first-color light sources, a plurality of second-color light sources and a plurality of third-color light sources, which are switched on in sequence, wherein the reflective display device is in a color display mode when the light source module is turned on, and the reflective display device is in a monochrome display mode when the light source module is turned off.

2. The reflective display device as recited in claim 1, wherein each of the display mediums further comprises a microcup structure, and the electrophoresis buffer, the black charged particles and the white charged particles are filled within the microcup structure.

3. The reflective display device as recited in claim 1, wherein the first-color light sources, the second-color light sources and the third-color light sources are respectively a plurality of red LED light sources, a plurality of blue LED light sources and a plurality of green LED light sources, or the first-color light sources, the second-color light sources and the third-color light sources are respectively a plurality of cyan LED light sources, a plurality of magenta LED light sources and a plurality of yellow LED light sources.

4. The reflective display device as recited in claim 3, wherein the first light sources, the second light sources and the third light sources are arranged alternately on one side of the reflective optical film.

5. The reflective display device as recited in claim 3, wherein the first light sources, the second light sources and the third light sources are arranged surrounding the circumference of the reflective optical film.

6. The reflective display device as recited in claim 3, wherein the light source module further comprises a plurality of fourth-color light sources, wherein the first-color light sources, the second-color light sources, the third-color light sources and the fourth-color light sources are switched on in sequence, and the fourth-color light sources are a plurality of white LED light sources.

7. A driving method for reflective display device used for driving the reflective display device as recited in claim 1, the driving method comprising:
    driving the electrophoretic display film when the light source module is turned on and switching the first-color light sources, the second-color light sources and the third-color light sources on with a switching frequency, wherein motion frequencies of the black charged particles and the white charged particles in the electrophoretic display film are synchronized with the switching frequency; and
    driving the electrophoretic display film when the light source module is turned off, so that the reflective display device transforms from the color display mode into the monochrome display mode.

8. The driving method for reflective display device as recited in claim 7, wherein renewal frequencies of the color display mode are larger than 10 Hertz.

9. The driving method for reflective display device as recited in claim 7, wherein the switching frequency is larger than 30 Hertz.

* * * * *